United States Patent
Beller et al.

(10) Patent No.: US 11,093,774 B2
(45) Date of Patent: Aug. 17, 2021

(54) OPTICAL CHARACTER RECOGNITION ERROR CORRECTION MODEL

(71) Applicant: International Business Machines Corporation, Armonk, NY (US)

(72) Inventors: Charles E. Beller, Baltimore, MD (US); Edward Graham Katz, Washington, DC (US); John A. Riendeau, Madison, WI (US); Christopher Phipps, Arlington, CA (US); Sean Thomas Thatcher, Stone Ridge, VA (US)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 16/702,693

(22) Filed: Dec. 4, 2019

(65) Prior Publication Data
US 2021/0174109 A1 Jun. 10, 2021

(51) Int. Cl.
*G06K 9/03* (2006.01)
*G06K 9/00* (2006.01)

(52) U.S. Cl.
CPC ........... *G06K 9/03* (2013.01); *G06K 9/00469* (2013.01); *G06K 2209/01* (2013.01)

(58) Field of Classification Search
CPC .... G06K 9/00469; G06K 9/03; G06K 9/2063; G06K 2209/01; G06F 40/174
USPC ........................................................ 382/159
See application file for complete search history.

(56) References Cited

U.S. PATENT DOCUMENTS

| 7,587,308 | B2 | 9/2009 | Kasravi et al. |
| 8,472,727 | B2 | 6/2013 | Gronau et al. |
| 8,792,751 | B1 * | 7/2014 | Eftekhari ............... G06K 9/033 382/309 |
| 9,152,883 | B2 | 10/2015 | Urbschat et al. |
| 9,990,564 | B2 | 6/2018 | Singh et al. |
| 10,289,905 | B2 | 5/2019 | Krivopaltsev et al. |

(Continued)

FOREIGN PATENT DOCUMENTS

WO 2018071403 4/2018

OTHER PUBLICATIONS

Lin, Huei-Yung, "Optical character recognition with fast training neural network", IEEE, Mar. 2016.
(Continued)

*Primary Examiner* — Daniel G Mariam
(74) *Attorney, Agent, or Firm* — Lieberman & Brandsdorfer, LLC

(57) ABSTRACT

Embodiments relate to an intelligent computer platform to create a document specific error correction model for amending OCR values. An image of a document is received and OCR is applied to the received image. Text is extracted from at least one static content field and the extracted text is compared to stored text from known static content. Responsive to a deviation identified in the comparison, a document specific error correction model is created and leveraged to correct OCR output. The model generates one or more variants for the dynamic content field associated with the static content field having the identified deviation. The generated variant(s) is subject to processing and one of the variants is selected as amended document content. A new document version is created from the amendment, the new document version including corrected OCR output.

18 Claims, 7 Drawing Sheets

(56) References Cited

U.S. PATENT DOCUMENTS 10,599,952 B1 * 3/2020 Farivar ................ G06K 9/6255
2007/0133874 A1 6/2007 Bressan et al.

OTHER PUBLICATIONS

Bassil, Y., et al., "OCR Post-Processing Error Correction Algorithm Using Google's Online Spelling Suggestion", Journal of Emerging Trends in Computing and Information Sciences, vol. 3, No. 1, Jan. 2012.
Chiron, G., et al., "ICDAR2017 Competition on Post-OCR Text Correction", Conference Paper, Nov. 2017.

* cited by examiner

OPTICAL CHARACTER RECOGNITION ERROR CORRECTION MODEL

BACKGROUND

The present embodiments relate to an artificial intelligence (AI) platform and machine learning for content directed optical character recognition (OCR) correction. More specifically, the embodiments relate to creating a document specific error correction model for identifying and amending OCR values.

In the field of artificial intelligent computer systems, natural language systems (such as the IBM Watson® artificial intelligent computer system and other natural language question answering systems) process natural language based on knowledge acquired by the system. To process natural language, the system may be trained with data derived from a database or corpus of knowledge, but the resulting outcome can be incorrect or inaccurate for a variety of reasons relating to peculiarities of language constructs and human reasoning.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. AI is able to learn from a data set to solve problems and provide relevant recommendations. AI is a subset of cognitive computing, which refers to systems that learn at scale, reason with purpose, and naturally interact with humans. Cognitive computing is a mixture of computer science and cognitive science. Cognitive computing utilizes self-teaching algorithms that use data minimum, visual recognition, and natural language processing to solve problems and optimize human processes.

SUMMARY

The embodiments include a system, computer program product, and method for identifying and amending optical character recognition (OCR) values.

In one aspect, a computer system is provided with a processing unit and memory for use with an artificial intelligence (AI) computer platform to create a document specific error correction model for amending optical character recognition (OCR) output. The processing unit is operatively coupled to the memory and is in communication with the AI platform. As shown and described, the AI platform includes tools in the form of a document manager, an extraction manager, a model manager, and a director. The document manager receives a document image, with the document image having at least one static content field and at least one dynamic content field represented therein. The extraction manager applies OCR to the received image, extracts text from the static content field, and compares the extracted text to stored text from known static content. In response to an identified deviation in the comparison, the model manager creates a document specific error correction model and leverages the error correction model to correct OCR output. The document specific error detection model generates at least one variant for the dynamic content field associated with the static content field having the identified deviation. The model manager further subjects the generated variant(s) to processing and selects the generated variant(s) responsive to the processing. The director selectively amends the dynamic content field having the identified deviation, with the amendment being aligned with the selected variant. The selective amendment effectively creates a new document version with corrected OCR output.

In another aspect, a computer program device is provided with a computer readable storage medium and embodied program code executable by a processor and configured to support a document error correction model for amending optical character recognition (OCR) values. Program code receives an image of a document, with the document having at least one static content field and at least one dynamic content field. OCR is applied to the received image to extract text from at least one static content field, and to compare the extracted text to stored text from known static content. Responsive to a deviation identified in the comparison, program code creates a document specific error correction model and leverages the model to correct OCR output. The document specific error detection model generates one or more variants for the dynamic content field associated with the static content field having the identified deviation. Program code subjects the variant(s) to processing, from which the generated variant(s) is selected. Program code selectively amends the dynamic content field having the identified deviation, with the selective amendment being aligned with the selected variant. A new document version with corrected OCR output is created from the selective amendment.

In yet another aspect, a method is provided for creating and leveraging a document specific error correction model for amending OCR values. An image of a document having at least one static content field and at least one dynamic content field is received. OCR is applied to the received image. Text is extracted from at least one static content field, and the extracted text is compared to stored text from known static content. Responsive to a deviation identified in the comparison, a document specific error correction model is created and leveraged to correct OCR output. The document specific error detection model generates one or more variants for the dynamic content field associated with the static content field having the identified deviation. The variant(s) is subject to processing and the generated variant(s) is selected, with the selective amendment being aligned with the selected variant. The dynamic content field having the identified deviation is amended, and a new document version is created. The new document version includes corrected OCR output.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

It is understood in the art that optical character recognition (OCR) is the use of technology to distinguish printed or handwritten text characters inside of digital images of physical documents, such as scanned documents. OCR involves examining the text of a document and translating the characters into code that can be used for data processing. OCR is sometimes also referred to as text recognition. Some examples of applications of OCR are scanning printed documents into versions that can be edited with word processors, indexing print material for search engines, and automating data entry, extraction, and processing. However, OCR technology is not perfect and recognition errors do occur. Currently consumers of OCR technology are not in a position to retrain their OCR model and must resort to employing additional labor or relying on a fuzzy search to identify OCR errors, which is both expensive and time consuming. As shown and described herein artificial intelligence (AI) is employed with OCR to improve performance and reduce errors. Employing OCR form recognition and document specific post processing correction reduces OCR errors and costs associated with the errors.

Figure 1:
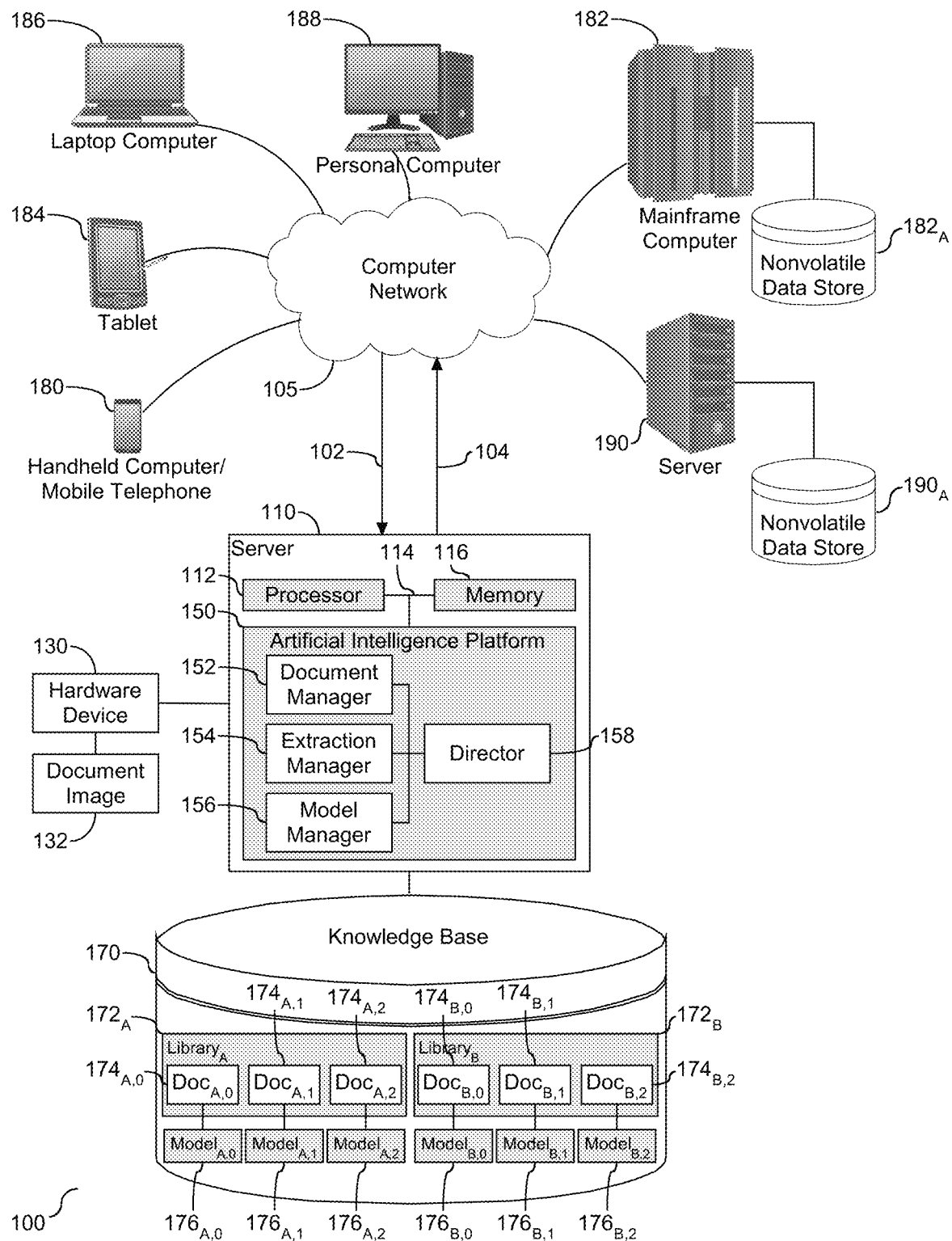
FIG. 1 depicts a system diagram illustrating an artificial intelligence platform computing system.

Referring to FIG. 1, a schematic diagram of an artificial intelligence platform computing system (100) is depicted. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with an artificial intelligence (AI) platform (150) for cognitive computing over the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The AI platform (150) is shown herein configured with tools to enable supervised learning. The tools function to create and utilize a document specific error correction model for amending optical character recognition (OCR) output. The tools include, but are not limited to, a document manager (152), an extraction manager (154), a model manager (156), and a director (158). The AI platform (150) may receive input across the network (105) and leverage a data source (170), also referred to herein as a corpus or knowledge base, to selectively access data. As shown the knowledge base (170), also referred to herein as a data source, is shown configured with two libraries, shown herein as library$_A$ ($172_A$) and library$_B$ ($172_B$). Although two libraries are shown herein, the quantity should not be considered limiting. Each library is populated with documents directed or associated with a domain. In one embodiment, each library is referred to as a document domain, with the document domain containing a group of documents classified or related to a specified sphere of knowledge or category of subject matter. In one embodiment, the library may be accessible over the network (105). Accordingly, the AI platform (150) and the corresponding tools (152)-(158) are operatively coupled to the knowledge base (170) and the corresponding domain libraries ($172_A$) and ($172_B$).

As shown, each library ($172_A$) and ($172_B$) is populated with a plurality of documents. In one embodiment, a document is a known form configured with one or more fields to receive data. As shown herein, library$_A$ ($172_A$) is shown with a plurality of documents, including documents doc$_{A,0}$ ($174_{A,0}$), doc$_{A,1}$ ($174_{A,1}$), and doc$_{A,2}$ ($174_{A,2}$) and library ($172_B$) is shown with a plurality of documents, including documents doc$_{B,0}$ ($174_{B,0}$), doc$_{B,1}$ ($174_{B,1}$), and doc$_{B,2}$ ($174_{B,2}$). Although only three documents are shown in each library this quantity should not be considered limiting. Each library shown also has an associated model. The models shown herein include, but are not limited to, model$_A$ ($176_A$) associated with library$_A$ ($172_A$), and model$_B$ ($176_B$) associated with library$_B$ ($172_B$). Each model represents anticipated dynamic content associated with the forms populated in the associated library. Details of how the libraries and models are utilized are shown and described in detail below. Accordingly, the knowledge base (170) is shown with libraries ($172_A$) and ($172_B$) to organize and store a plurality of documents ($174_{A,0}$)-($174_{A,2}$) and ($174_{B,0}$)-($174_{B,2}$) and corresponding models ($176_A$) and ($176_B$).

It is understood that supervised learning leverages data from the knowledge base. As shown herein, the knowledge base (170) is configured with data in the form of libraries and models. The document manager (152) functions to receive an image of a document that is external to the libraries in the knowledge base (170). In one embodiment, the received document image may be a photograph taken of the document. In another embodiment, the document image may be from a hardware device, such as a scanner. The document manager (152) may receive the document image (132) from a hardware device, e.g. scanner, camera, etc., operatively coupled to the server (110), or in one embodiment, the document image (132) may be received from one or more of the various computing devices (180), (182), (184), (186), (188), and (190) in communication with the network (105). In one embodiment, the document image (132) is an image of a form or document that corresponds to or is related to a form document from a known set of standardized forms, i.e. a government form, which is populated in at least one of the knowledge base libraries ($172_A$) and ($172_B$). The document manager (152) is operatively coupled to libraries ($172_A$) and ($172_B$). The document manger (152) leverages the libraries ($172_A$) and ($172_B$) to identify a library member form that corresponds to the received image. Accordingly, the document manager (152) functions to identify a relationship between the received document image and one or more forms populated in at least one of the knowledge base libraries.

The document image (132) contains both static content fields and dynamic content fields. The static content, or static text, refers to the data that is part of the form that is fixed. For example, that static content may be in the form of text or document indicia that appears above or below a field configured to receive data or indicia. Dynamic content is data or indicia that is not permanently part of or fixed to the document, but is detected or should be detectable by the hardware device (130). With respect to the example of a form document with static content, the dynamic content is data or indicia that are entered onto the form. For example, the text "Annual Income" corresponding to a field on a government form is classified or designated as static content and the amount entered into the field is classified as dynamic content. Accordingly, the document image contains both static and dynamic content fields detectable by the hardware device.

The extraction manager (154), which is shown herein operatively coupled to the document manager (152), functions to apply optical character recognition (OCR) to the received document image (132). The extraction manager (154) extracts the static text or static indicia from at least one static content field in the document image (132). The extraction manager (154) also extracts dynamic content from at least one dynamic content field in the document image (132). The extraction manager (154) compares the extracted static text or static indicia from the document image (132) to known static content of a corresponding or related library document, as identified by the document manager (152) and stored in one of the libraries ($172_A$) and ($172_B$). The comparison of the extracted static content to the known static content serves to detect errors in image output. For example, in the case of the hardware device (130) being a scanner, an error may be directed to OCR data. A deviation identified between the extracted and known static content is indicative of an error with the document image (132), e.g. an OCR error. A lack of an identified deviation is an indication that no error has occurred or is apparent with the document image (132). In one embodiment, the extraction manager (154) is configured to determine that document image is an updated version of a known form and the known static content in libraries ($172_A$) and ($172_B$) is appropriately updated. Accordingly, the extraction manager (154) functions to conduct document comparisons and identify and static content deviation.

The model manger (156) is operatively coupled to the document manager (152), the extraction manager (154), and libraries ($172_A$) and ($172_B$) via the connection to the knowledge base (170). The model manager (156) functions to create a document specific error correction model for each library document. For example, as shown herein $model_{A,0}$ ($176_{A,0}$) is associated with $document_{A,0}$ ($174_{A,0}$), $model_{A,1}$ ($176_{A,1}$) is associated with $document_{A,1}$ ($174_{A,1}$), $model_{A,2}$ ($176_{A,2}$) is associated with $document_{A,2}$ ($174_{A,2}$), $model_{B,0}$ ($176_{B,0}$) is associated with $document_{B,0}$ ($174_{B,0}$), $model_{B,1}$ ($176_{B,1}$) is associated with $document_{B,1}$ ($174_{B,1}$), and $model_{B,2}$ ($176_{B,2}$) is associated with $document_{B,2}$ ($174_{B,2}$). The model manager (156) leverages the models to generate one or more variants for each dynamic content field. In one embodiment, a base model may be employed to represent a collection, with individual documents in the collection having their own model built on the base model. The model manager (156) analyzes deviations between the extracted and known static content, as identified by the extraction manager (154), to identify any relationships between the extracted and known static content, and incorporate the identified relationship(s) into a document specific error model. For example, in a known form, the known static content of a field on the form is "Country". However, after OCR is applied to the image, the extracted static content of the same field is "Oountry". The extraction manager (154) identifies the deviation between "Country" and "Oountry" and the model manager (156) determines that for this document image the OCR has identified "C" as an "O", and reflects that identified deviation into the document specific error model. Accordingly, the model manager (156) creates a document specific error correction model by incorporating the identified deviations between the known and extracted static content from the image.

It is understood in the art that once created the document correction model may grow through inclusion of additional identified deviations. As shown herein, each model is associated with a specific library, and is directed at a specific population of documents. In one embodiment, the model is a confusion matrix that outlines different predictions and test results and contrasts them with real-world values. The model manager (156) further functions to leverage the created document specific error correction model to correct OCR output of dynamic content. The dynamic content in the image is unknown and varies from form to form based on information that was received as form input. It is understood that with variations of the dynamic content, there is no known dynamic content to compare the extracted dynamic content to identify deviations. The model manager (156) leverages the document specific error correction model to generate two or more variants for received dynamic content field data associated with a static content field having an identified deviation. In the example above, wherein the OCR identifies the static deviation of "C" as an "O" for a country field, and the OCR further identifies corresponding dynamic content consisting of "Oanada", the model manager (156) leverages either $model_A$ ($176_A$) or $model_B$ ($176_B$) to generate two or more variants for the dynamic content. Accordingly, the model manager (156) leverages the created document specific error models to generate one or more variants for each dynamic content field associated with an identified deviation.

The model manager (156) further processes the generated variant(s) for each dynamic content field. In one embodiment, the processing is scoring the generated variant(s) for each field value. The more likely the generated variant is appropriate for the field value, the higher the score the variant receives. In one embodiment, the scoring involves filtering the variants based on a restricted character class. Different fields on a form may have different character class restrictions. For example, a "Date of Birth" field might be restricted to the characters [0-9], "/" and "-". Generated variants containing only those characters will be ranked higher than variants that do not contain only those characters. In another embodiment, scoring involves domain based keyword matching. Continuing with example in which the known static content field is "Country", terminology related to geography is to be expected, and as such, the generated variant "Canada" would be ranked higher than other generated variants that are not geographical locations. Generated variants that match such geographical terminology would be scored more highly. Accordingly, the model manager (156) processes the generated variant(s) and applies a score to the variant(s) based on the relevancy to the content field.

The director (158), which is shown operatively coupled to the model manager (156), functions to selectively amend dynamic content associated with the deviation. In response to the processing of the variant(s) by the model manager (156), the director (158) selects the highest scored variant to selectively amend the dynamic content associated with the static field with the deviation. The director (158) creates a new document version based on the selective amendment(s), with the new document version containing the correct OCR output. Accordingly, the director (158) selectively amends the dynamic content of the document to provide a modified document with corrected OCR output.

As shown, the network (105) may include local network connections and remote connections in various embodiments, such that the AI platform (150) may operate in environments of any size, including local and global, e.g. the Internet. Additionally, the AI platform (150) serves as a front-end system that can make available a variety of knowledge extracted from or represented in network accessible sources and/or structured data sources. In this manner, some processes populate the AI platform (150), with the artificial intelligence platform (150) also including input interfaces to receive requests and respond accordingly.

The knowledge base (170) is configured with libraries ($172_A$) and ($172_B$) for use by the AI platform (150). In one embodiment, the knowledge base (170) may be configured with other or additional libraries, and as such, the quantity of libraries shown and described herein should not be considered limiting. Similarly, in one embodiment, the knowledge base (170) includes structured, semi-structured, and/or unstructured content related to activities and tasks. The various computing devices (180)-(190) in communication with the network (105) may include access points for the logically grouped domains and models.

The network (105) may include local network connections and remote connections in various embodiments, such that the artificial intelligence platform (150) may operate in environments of any size, including local and global, e.g. the Internet. Additionally, the artificial intelligence platform (150) serves as a front-end system that can make available a variety of knowledge extracted from or represented in network accessible sources and/or structured data sources. In this manner, some processes populate the AI platform (150), with the AI platform (150) also including one or more input interfaces or portals to receive requests and respond accordingly.

The AI platform (150), via a network connection or an internet connection to the network (105), is configured to detect and manage network activity and task data as related to travel and travel scheduling. The AI platform (150) may effectively orchestrate or optimize an orchestrated sequence of actions directed at related activity data by leveraging the knowledge base (170), which in one embodiment may be operatively coupled to the server (110) across the network (105).

The AI platform (150) and the associated tools (152)-(158) leverage the knowledge base (170) and libraries ($172_A$) and ($172_B$) to enable document modification. The extraction manager (154) leverages the document manager (152) to extract static and dynamic content from a received image. The model manager (156) leverages the extraction manager (154) to create a document specific error correction model. The director (158) leverages the model manager (156) to selectively amend static and dynamic content fields and create a new document version with corrected OCR output. Accordingly, the tools (152)-(158) create a document specific error correction model and leverage the created model for amending OCR output values.

Documents and communications, e.g. electronic mail and messages, received across the network (105) may be processed by a server (110), for example IBM Watson® server, and the corresponding AI platform (150). As shown herein, the AI platform (150) together with the embedded tools (152)-(158) amend OCR output. The function of the tools and corresponding analysis is to create and leverage a generated document specific error model to OCR output. Accordingly, the AI platform (150) corrects OCR output using the created document specific error correction model.

In some illustrative embodiments, the server (110) may be the IBM Watson® system available from International Business Machines Corporation of Armonk, N.Y., which is augmented with the mechanisms of the illustrative embodiments described hereafter. The tools (152)-(158), hereinafter referred to collectively as AI tools, are shown as being embodied in or integrated within the AI platform (150) of the server (110). The AI tools may be implemented in a separate computing system (e.g., 190), or in one embodiment they can be implemented in one or more systems connected across network (105) to the server (110). Wherever embodied, the AI tools function to create a document specific error correction model and leverage the created model for amending OCR output values.

Types of devices and corresponding systems that can utilize the AI platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various devices and systems can be networked together using computer network (105). Types of computer network (105) that can be used to interconnect the various devices and systems include Local Area Networks (LANs), Wireless Local Area Networks (WLANs), the Internet, the Public Switched Telephone Network (PSTN), other wireless networks, and any other network topology that can be used to interconnect the devices and systems. Many of the devices and systems include nonvolatile data stores, such as hard drives and/or nonvolatile memory. Some of the devices and systems may use separate nonvolatile data stores (e.g., server (190) utilizes nonvolatile data store ($190_A$), and mainframe computer (182) utilizes nonvolatile data store ($182_A$). The nonvolatile data store ($182_A$) can be a component that is external to the various devices and systems or can be internal to one of the devices and systems.

The device(s) and system(s) employed to support the artificial intelligence platform (150) may take many forms, some of which are shown in FIG. 1. For example, an information handling system may take the form of a desktop, server, portable, laptop, notebook, or other form factor computer or data processing system. In addition, the device(s) and system(s) may take other form factors such as a personal digital assistant (PDA), a gaming device, ATM machine, a portable telephone device, a communication device or other devices that include a processor and memory.

Figure 2:
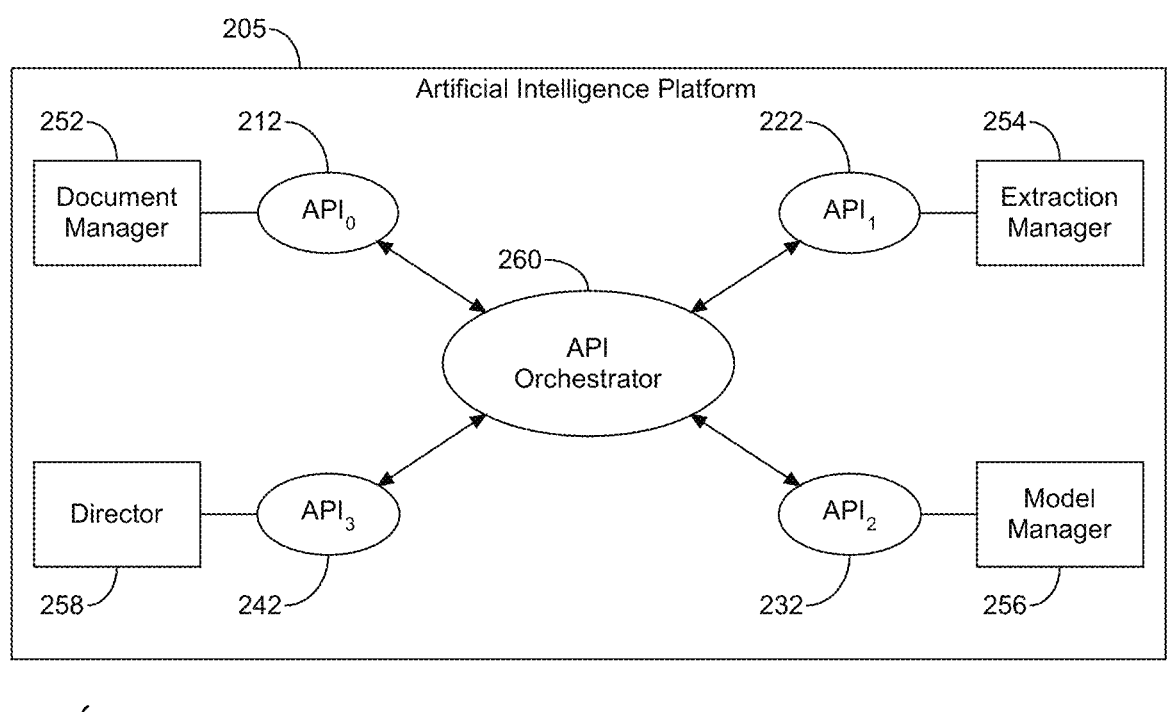
FIG. 2 depicts a block diagram illustrating the artificial intelligence platform tools, as shown and described in FIG. 1, and their associated application program interfaces.

An Application Program Interface (API) is understood in the art as a software intermediary between two or more applications. With respect to the AI platform (150) shown and described in FIG. 1, one or more APIs may be utilized to support one or more of the tools (152)-(158), shown herein as tools (252)-(258), and their associated functionality. Referring to FIG. 2, a block diagram (200) is provided illustrating the tools (252)-(258) and their associated APIs. As shown, a plurality of tools is embedded within the AI platform (205), with the tools including the document manager (152) shown herein as (252) associated with $API_0$ (212), the extraction manager (154) shown herein as (254) associated with $API_1$ (222), the model manager (156) shown herein as (256) associated with $API_2$ (232), and the director (158) shown herein as (258) associated with $API_3$ (242).

Each of the APIs may be implemented in one or more languages and interface specifications. $API_0$ (212) provides functional support to receive an image of a document; $API_1$ (222) provides functional support to extract content from the image and identify deviations between the extracted image content and known content; $API_2$ (232) provides functional support create and leverage a document specific error correction model, and $API_3$ (242) provides functional support to selectively amend extracted image content and create a new document version. As shown, each of the APIs (212), (222), (232), and (242) are operatively coupled to an API orchestrator (270), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
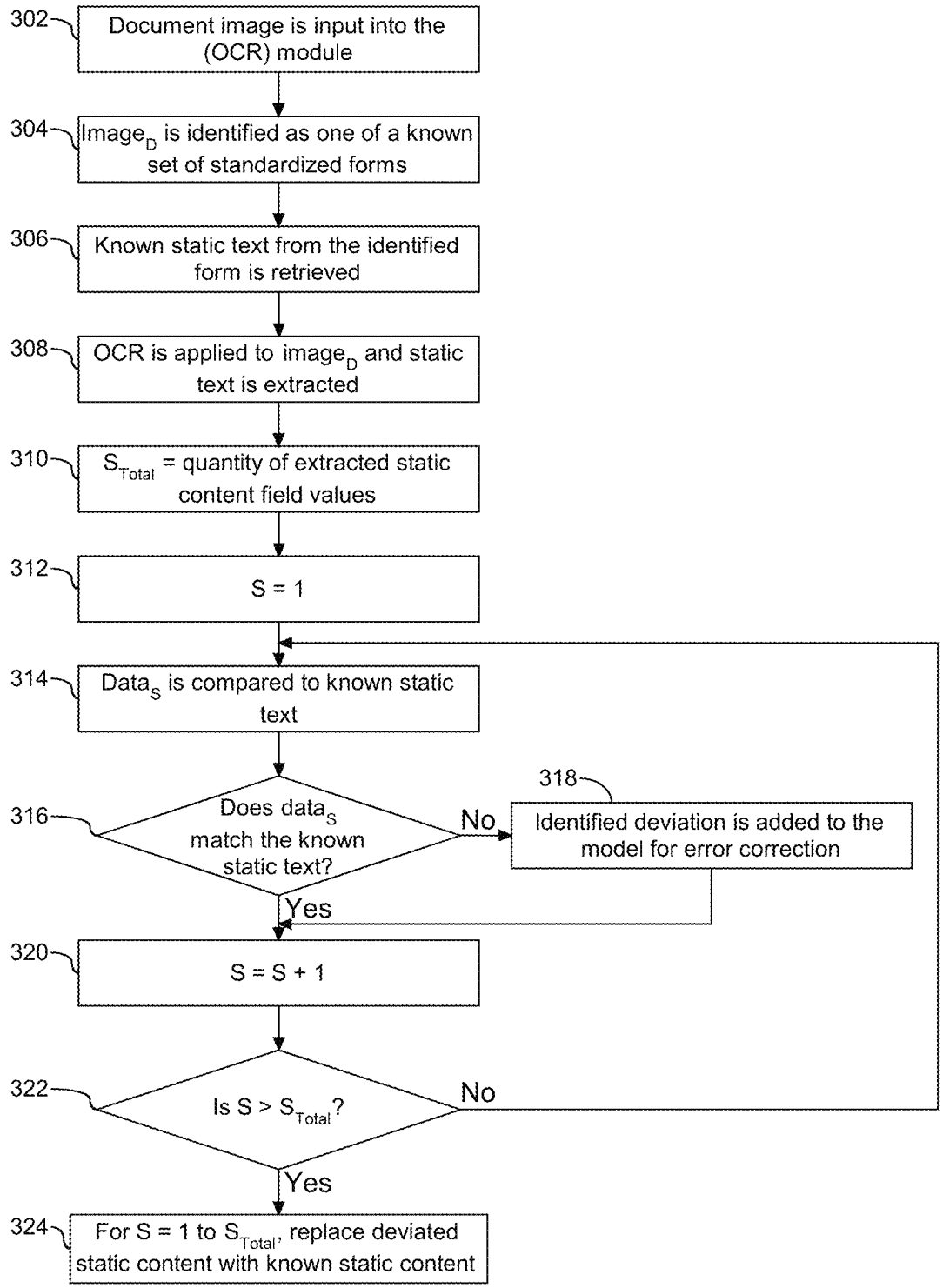
FIG. 3 depicts a flow chart illustrating a process for identifying deviations or errors in OCR as related to document static content fields.

Referring to FIG. 3, a flow chart (300) is provided to illustrate a process for identifying deviations or errors in OCR as related to document static content fields. As shown, an image is taken of a document, and the image is input into an optical character recognition (OCR) module (302). The image of the document, $image_D$, is then identified as one of a known set of standardized forms (304). The OCR module is configured to recognize a set number of forms, such as a government form or a passport. These types of forms are merely mentioned as examples and are not meant to be limiting. Known static content, such as text, from the identified form is retrieved from a library, such as a pre-configured database, operatively coupled to the OCR module (306). The static content, or static text, refers to the text that is part of the form, or is text that appears above or below a field in which the entry of information is requested. Dynamic content refers to data that is entered onto the form. For example, content in the form of a string, such as the text "Annual Income" corresponding to a field on a government form, is the static content of the form, and the value or amount entered into the field is the dynamic content. The static and dynamic content of a government form is used as an example and is not meant to be limiting. Accordingly, as a document is input as an image, the document is identified as one of a known set and the known static text of the identified document is retrieved by the OCR module.

Following the retrieval of known static content of the identified form, OCR is applied to the $image_D$ and static text is extracted from the document (308). The variable $S_{Total}$ is assigned to represent the quantity of extracted static content field values (310). The variable S, represents a static content field counting variable, is initialized (312). The static content field, $field_S$, is identified, corresponding string data, $data_S$, is extracted from the content field, $field_S$, and the extracted string data is compared to known static text retrieved from the library (314). It is then determined if the extracted static content text, $data_S$, of the input document matches the known static content identified from the library (316). A positive response to the determination at (316) indicates that the OCR processed the static content from the document correctly, and no document specific error correction is necessary for $field_S$. However, a negative response to the determination at step (316) is an indication that the OCR did not process the document correctly and there is at least one error present in the OCR output for $field_S$. In one embodiment static content missing from the document is flagged for potential degradation of the document. The identified deviation of the $data_S$ in $field_S$ from the known static content (318) is added to a document correction model. More specifically, the document correction model is built using the deviation of the OCR static content from the known static content, which is leveraged with respect to the dynamic field content, as shown and described in FIG. 4. Following adding the identified deviation to the document correction model at step (318), the counting variable S is incremented (320), following by conducting a determination to assess if each static content field in the document has been evaluated (322). A negative response to the determination at step (322) is followed by a return to step (314), and a positive response to the determination at step (322) ends the deviation assessment associated with the static content fields. Accordingly, the OCR process includes evaluation of known static content with machine recognized static content.

It is understood that the evaluation of the static content is directed at assessing the quality of the OCR, which may impact the evaluation of the OCR with respect to the dynamic content. Since static content is inherently known, correction of corresponding static content fields may be applied or updated. As shown and following step (322), for each static content field with a recognized deviation of the corresponding static content, the error is corrected, and the document is then regenerated with the static content fields identified as having errors being replaced with the known static content (324). Accordingly, the document is regenerated with the static content having a recognized deviation being selectively amended with the known static content.

Figure 4:
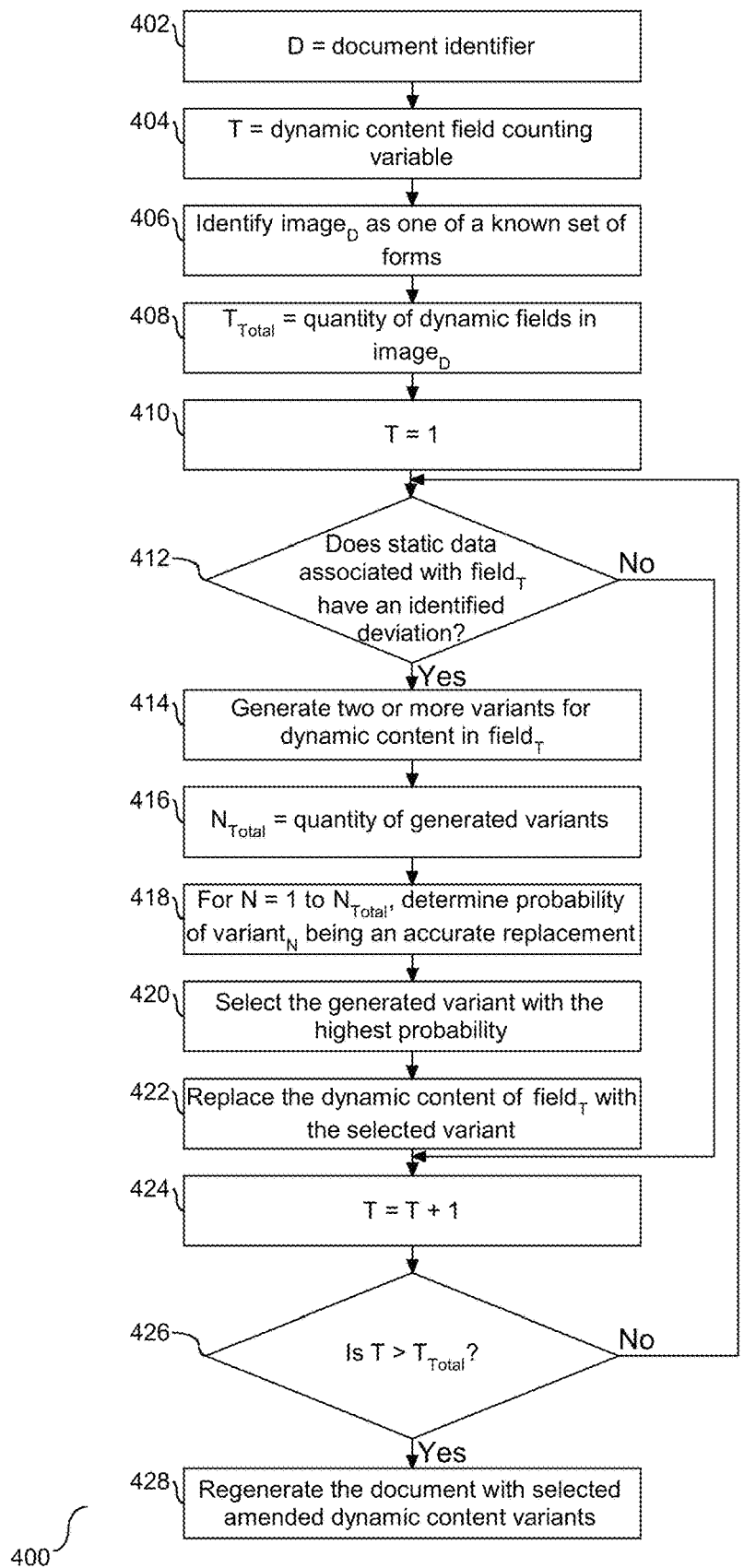
FIG. 4 depicts a flow chart illustrating a process for assessing dynamic field content, and selectively correcting the assessed dynamic field content.

It is understood that form based documents subject to OCR includes both static content fields, and dynamic content populated into corresponding fields. Referring to FIG. 4, a flow chart (400) is provided to illustrate a process for assessing dynamic field content, and selectively correcting the assessed dynamic field content. Static document content refers to string data that is fixed. A form based document includes two classes of static document content, including string data without an associated dynamic content field, and string data with an associated dynamic content field. The variable D is defined as a document identifier (402), and the variable T is defined as a dynamic content field counting variable (404). Referring back to the input image of the document from FIG. 3, the image of the document, image$_D$, is identified as one of a known set of standardized forms (406). More specifically, at step (406) the document identified D is leveraged to identify a classification of the corresponding document image. The variable $T_{Total}$ is assigned to represent the quantity of dynamic fields present in the document, e.g. image$_D$, (408). In one embodiment, the quantity of dynamic fields is a characteristic of the image classification. A corresponding dynamic field counting variable T is initialized (410). The dynamic field deviation is related to the static field deviation, if any, as identified and demonstrated in FIG. 3. Following step (410), it is determined if the static data field corresponding to the dynamic data field, field$_T$, has an identified deviation (412). A positive response to the determination at (412) indicates that an error in the OCR output for the corresponding static field has been identified, and as such, the corresponding dynamic content is subject to deviation assessment as directed to OCR. Accordingly, dynamic content fields associated with static content fields containing deviations are identified for further evaluation.

The error correction model, hereinafter referred to as a model, is leveraged in response to the determination at (412). In one embodiment, the model is a confusion matrix that outlines predictions or results. With respect to the system and process shown and described herein, the confusion matrix identifies possible variants of entry content for the corresponding dynamic field. As shown herein, the model generates or otherwise identifies one or more variants for the dynamic content in field$_T$ (414). The variants are generated based on the document specific error correction model for the dynamic content in field$_T$. The variable $N_{Total}$ is assigned to represent the quantity of generated variants (416), and for each generated variant, the probability of the variant$_N$ being an accurate replacement for the dynamic content in field$_T$ is determined and assigned to the variant$_N$ (418). In one embodiment, the determined probability at step (418) is based on the generated variant having a restricted character class. Different fields on a form may have different character class restrictions. For example, a "Date of Birth" field might be restricted to the characters [0-9], "/" and "-". Generated variants containing those characters will be assigned a higher probability of being accurate than variants that do not contain those characters. In another embodiment, the determined probability is based on domain based keyword matching. For example, in an area of the government form about deprecating assets, terminology related to motor-vehicles might be expected. Generated variants that contain such motor-vehicle terminology would have a higher probability of being accurate than generated variants that those variants that do not. Upon determining the probability of each generated variant, the variant with the highest probability is selected (420) and used to replace the dynamic content of dynamic field$_T$ (422). Accordingly, one or more variants are generated for the dynamic content in the identified dynamic content field, and the generated variant with the highest determined probability of being an accurate replacement of the dynamic content is selected.

The counting variable, T, is incremented (424) following either (422) or a negative response to the determination at (412). It is then determined if every dynamic content field in the document has been evaluated (426). A negative response to the determination at (426) is followed by a return to step (412) and a positive response to the determination at (426) concludes the process of evaluating dynamic content fields. The document is regenerated with the selectively amended dynamic content variant(s) (428). Accordingly, the document is regenerated by selectively amending dynamic field content with a dynamic content variant from the document specific error correction model.

Figure 5:
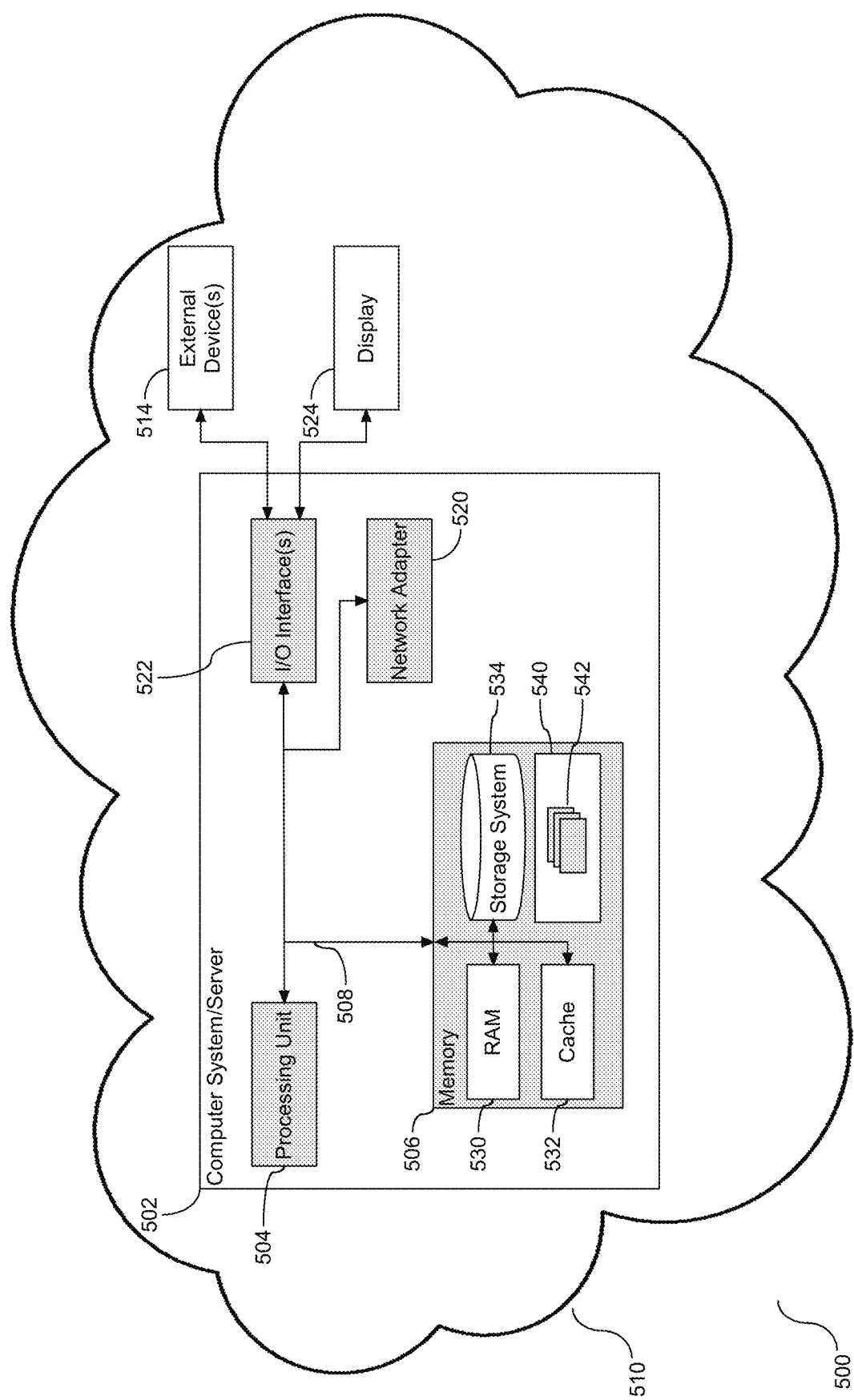
FIG. 5 depicts a block diagram illustrating an example of a computer system/server of a cloud based support system, to implement the system and processes described above with respect to FIGS. 1-4.

Embodiments shown and described herein may be in the form of a computer system for use with an intelligent computer platform for creating a document specific error correction model for amending OCR values. The embodiments and their associated functionality may be embodied in a computer system/server in a single location, or in one embodiment, may be configured in a cloud based system sharing computing resources. With reference to FIG. 5, a block diagram (500) is provided illustrating an example of a computer system/server (502), hereinafter referred to as a host (502) in a cloud computing environment (510), to implement the system, tools, and processes described above with respect to FIGS. 1-4. Host (502) is operational with numerous other general purpose or special purpose computing system environments or configurations. Examples of well-known computing systems, environments, and/or configurations that may be suitable for use with host (502) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (502) may be described in the general context of computer system-executable instructions, such as program modules, being executed by a computer system. Generally, program modules may include routines, programs, objects, components, logic, data structures, and so on that perform particular tasks or implement particular abstract data types. Host (502) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, host (502) is shown in the form of a general-purpose computing device. The components of host (502) may include, but are not limited to, one or more processors or processing units (504), e.g. hardware processors, a system memory (506), and a bus (508) that couples various system components including system memory (506) to processor (504). Bus (508) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (502) typically includes a variety of computer system readable media. Such media may be any available media that is accessible by host (502) and it includes both volatile and non-volatile media, removable and non-removable media.

Memory (506) can include computer system readable media in the form of volatile memory, such as random access memory (RAM) (530) and/or cache memory (532). By way of example only, storage system (534) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (508) by one or more data media interfaces.

Program/utility (540), having a set (at least one) of program modules (542), may be stored in memory (506) by way of example, and not limitation, as well as an operating system, one or more application programs, other program modules, and program data. Each of the operating systems, one or more application programs, other program modules, and program data or some combination thereof, may include an implementation of a networking environment. Program modules (542) generally carry out the functions and/or methodologies of embodiments to create a document specific error correction model and leverage the created model for amending one or more OCR output values. For example, the set of program modules (542) may include the tools (152)-(158) as described in FIG. 1.

Host (502) may also communicate with one or more external devices (514), such as a keyboard, a pointing device, etc.; a display (524); one or more devices that enable a user to interact with host (502); and/or any devices (e.g., network card, modem, etc.) that enable host (502) to communicate with one or more other computing devices. Such communication can occur via Input/Output (I/O) interface(s) (522). Still yet, host (502) can communicate with one or more networks such as a local area network (LAN), a general wide area network (WAN), and/or a public network (e.g., the Internet) via network adapter (520). As depicted, network adapter (520) communicates with the other components of host (502) via bus (508). In one embodiment, a plurality of nodes of a distributed file system (not shown) is in communication with the host (502) via the I/O interface (522) or via the network adapter (520). It should be understood that although not shown, other hardware and/or software components could be used in conjunction with host (502). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (506), including RAM (530), cache (532), and storage system (534), such as a removable storage drive and a hard disk installed in a hard disk drive.

Computer programs (also called computer control logic) are stored in memory (506). Computer programs may also be received via a communication interface, such as network adapter (520). Such computer programs, when run, enable the computer system to perform the features of the present embodiments as discussed herein. In particular, the computer programs, when run, enable the processing unit (504) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (502) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
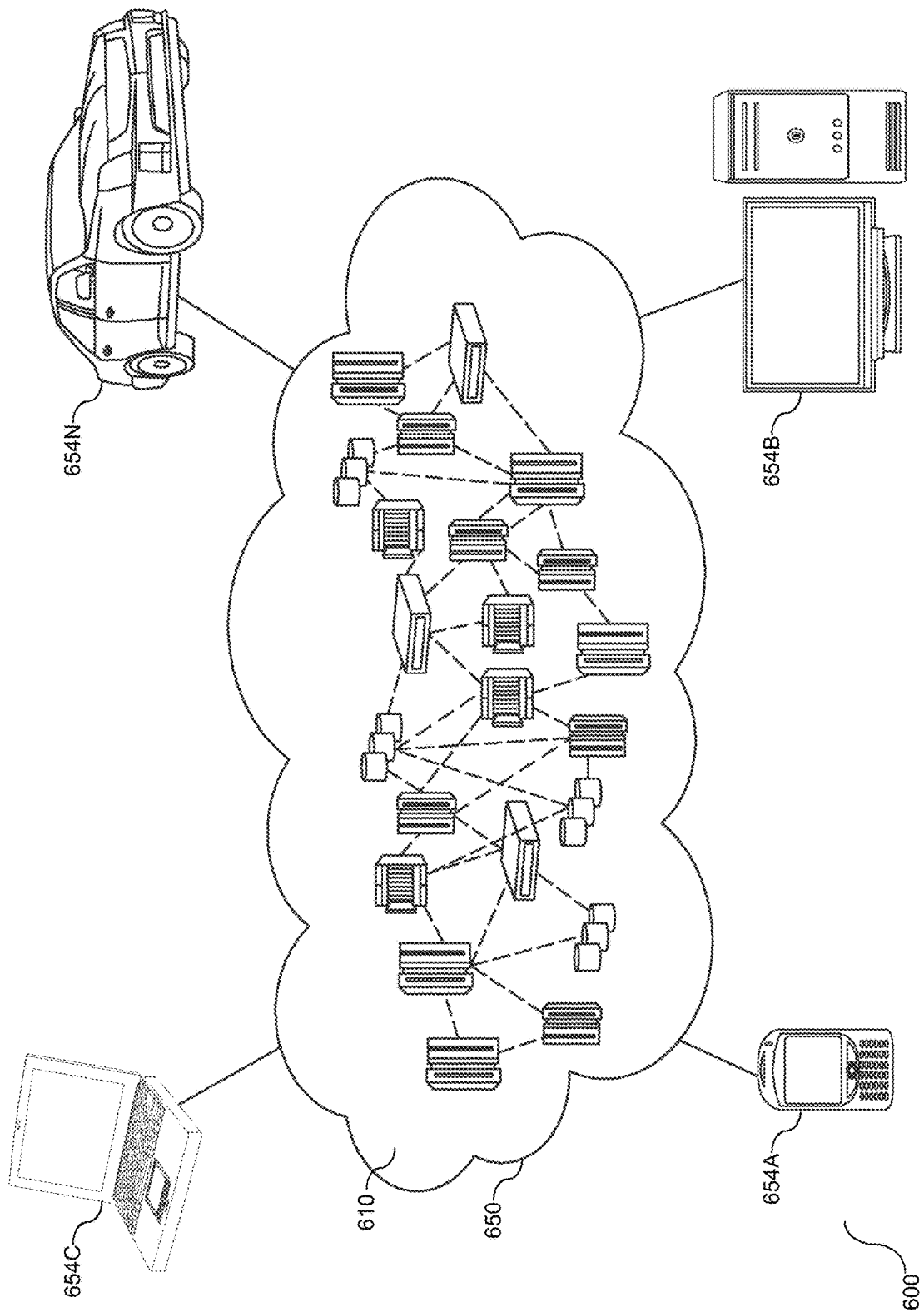
FIG. 6 depicts a block diagram illustrating a cloud computer environment.

Referring now to FIG. 6, an illustrative cloud computing network (600). As shown, cloud computing network (600) includes a cloud computing environment (650) having one or more cloud computing nodes (610) with which local computing devices used by cloud consumers may communicate. Examples of these local computing devices include, but are not limited to, personal digital assistant (PDA) or cellular telephone (654A), desktop computer (654B), laptop computer (654C), and/or automobile computer system (654N). Individual nodes within nodes (610) may further communicate with one another. They may be grouped (not shown) physically or virtually, in one or more networks, such as Private, Community, Public, or Hybrid clouds as described hereinabove, or a combination thereof. This allows cloud computing environment (600) to offer infrastructure, platforms and/or software as services for which a cloud consumer does not need to maintain resources on a local computing device. It is understood that the types of computing devices (654A-N) shown in FIG. 8 are intended to be illustrative only and that the cloud computing environment (650) can communicate with any type of computerized device over any type of network and/or network addressable connection (e.g., using a web browser).

Figure 7:
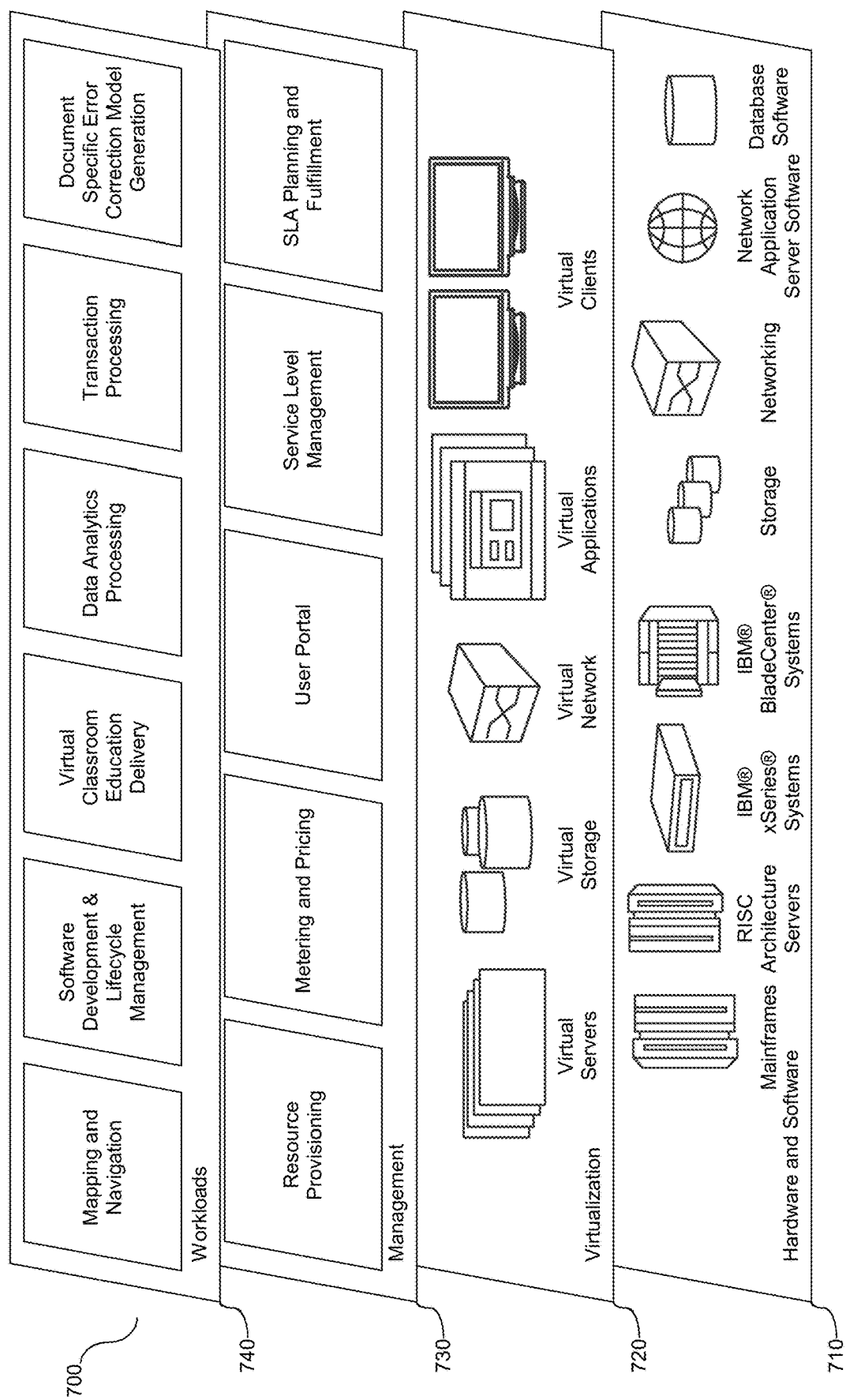
FIG. 7 depicts a block diagram illustrating a set of functional abstraction model layers provided by the cloud computing environment.

Referring now to FIG. 7, a set of functional abstraction layers (700) provided by the cloud computing network of FIG. 6 is shown. It should be understood in advance that the components, layers, and functions shown in FIG. 7 are intended to be illustrative only, and the embodiments are not limited thereto. As depicted, the following layers and corresponding functions are provided: hardware and software layer (710), virtualization layer (720), management layer (730), and workload layer (740).

The hardware and software layer (710) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (720) provides an abstraction layer from which the following examples of virtual entities may be provided: virtual servers; virtual storage; virtual networks, including virtual private networks; virtual applications and operating systems; and virtual clients.

In one example, management layer (730) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (740) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and document specific error correction model generation.

It will be appreciated that there is disclosed herein a system, method, apparatus, and computer program product for creating a document specific error correction model for amending OCR values without retraining.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, method, and/or a computer program product are operative to improve the functionality and operation of an artificial intelligence platform to create a document specific error correction model for amending OCR values and corresponding dynamic content without retraining.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
    a processing unit operatively coupled to memory;
    an artificial intelligence platform in communication with the processing unit, the platform including one or more tools to identify and amend one or more optical character recognition (OCR) values, including:
        a document manager to receive an image of a document, wherein the document has at least one static content field and at least one dynamic content field;
        an extraction manager, operatively coupled to the document manager, the extraction manager to apply OCR to the received image, extract text from the at least one static content field, and compare the extracted text to stored text from known static content;
        a model manager, operatively coupled to the extraction manager, the model manager, responsive to a deviation identified in the comparison, to create a document specific error correction model, and leverage the error correction model to correct OCR output;
        the model manager to employ the document specific error correction model to generate one or more variants for the dynamic content field associated with the static content field having the identified deviation;
        the model manager to subject the one or more generated variants to processing, and select one of the one or more generated variants responsive to the processing; and
        a director, operatively coupled to the model manager, to create a new document version from the selective amendment, the new document version including the selected one or more variants as corrected OCR output.

2. The computer system of claim 1, further comprising the extraction manager to utilize artificial intelligence to identify one or more updates to the known static content.

3. The computer system of claim 2, wherein the error correction model is trained using string data from the static content field to predict the one or more variants for string data for the dynamic content field.

4. The computer system of claim 2, further comprising the model manager to file the generated one or more variants based on a restricted character class assigned to the static content field.

5. The computer system of claim 2, wherein subjecting the one or more variants to processing further comprises the model manager to assess a score for each of the one or more variants, wherein the assessed score is responsive to domain based keyword matching associated with the static content field.

6. The computer system of claim 1, further comprising the director to selectively amend the static content field having the identified deviation, the selective amendment aligned with the selected variant.

7. A computer program product to identify and amend one or more optical character recognition (OCR) values, the computer program product comprising a computer readable storage medium having program code embodied therewith, the program code executable by a processor to:
    receive an image of a document, wherein the document has at least one static content field and at least one dynamic content field;
    apply optical character recognition (OCR) to the received image, extract text from the at least one static content field, and compare the extracted text to stored text from known static content;
    responsive to a deviation identified in the comparison, create a document specific error correction model, and leverage the error correction model to correct OCR output;
    the error correction model to generate one or more variants for the dynamic content field associated with the static content field having the identified deviation;
    subject the one or more generated variants to processing, and select one of the one or more generated variants responsive to the processing;
    selectively amend the static content field having the identified deviation, the selective amendment aligned with the selected variant; and
    create a new document version from the selective amendment, the new document version including the selected one or more variants as corrected OCR output.

8. The computer program product of claim 7, wherein the error correction model utilizes artificial intelligence (AI) to identify one or more updates to the static content field.

9. The computer program product of claim 8, wherein the error correction model is trained using string data from the static content field to predict the one or more variants for string data for the dynamic content field.

10. The computer program product of claim 8, further comprising program code to filter the generated one or more variants based on a restricted character class assigned to the static content field.

11. The computer program product of claim 8, wherein subjecting the one or more variants to processing further comprises program code to assess a score for each of the one or more variants, wherein the assessed score is responsive to domain based keyword matching associated with the static content field.

12. The computer program product of claim 7, further comprising program code to selectively amend the static content field having the identified deviation, the selective amendment aligned with the selected variant.

13. A method comprising:
    receiving an image of a document, wherein the document has at least one static content field and at least one dynamic content field;
    applying optical character recognition (OCR) to the received image, extracting text from the at least one static content field, and comparing the extracted text to stored text from known static content;
    responsive to a deviation identified in the comparison, creating a document specific error correction model, and leveraging the error correction model to correct OCR output;
    the error correction model generating one or more variants for the dynamic content field associated with the static content field having the identified deviation;
    subjecting the one or more generated variants to processing, and selecting one of the one or more generated variants responsive to the processing;

selectively amending the static content field having the identified deviation, the selective amendment aligned with the selected variant; and creating a new document version from the selective amendment, the new document version including the selected one or more variants as corrected OCR output.

14. The method of claim 13, wherein the error correction model utilizes artificial intelligence (AI) to identify one or more updates to the static content field.

15. The method of claim 14, wherein the error correction model is trained using string data from the static content field to predict the one or more variants for string data for the dynamic content field.

16. The method of claim 14, further comprising filtering the generated one or more variants based on a restricted character class assigned to the static content field.

17. The method of claim 14, wherein subjecting the one or more variants to processing further comprises assessing a score for each of the one or more variants, wherein the assessed score is responsive to domain based keyword matching associated with the static content field.

18. The method of claim 13, further comprising selectively amending the static content field having the identified deviation, the selective amendment aligned with the selected variant.

\* \* \* \* \*